Figure 1:
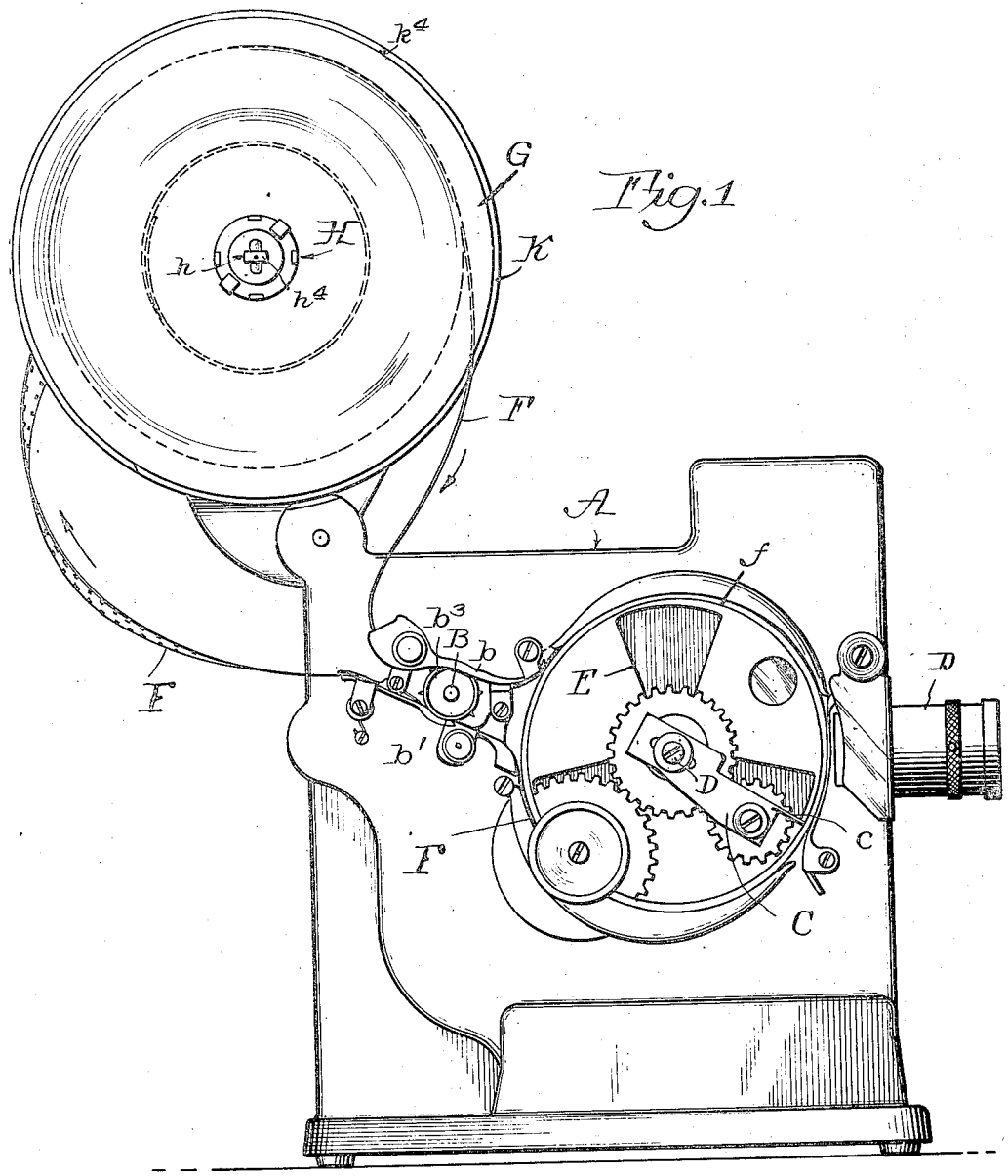

March 13, 1934.　　J. W. DROLL ET AL　　1,950,601

FILM WINDING MECHANISM

Filed Sept. 11, 1930　　3 Sheets-Sheet 1

Witness:
Chas. R. Koursh.

Inventors,
Joseph W. Droll &
Alex H. Olson
By Fred Gerlach, their Atty.

March 13, 1934.    J. W. DROLL ET AL    1,950,601
FILM WINDING MECHANISM
Filed Sept. 11, 1930    3 Sheets-Sheet 2
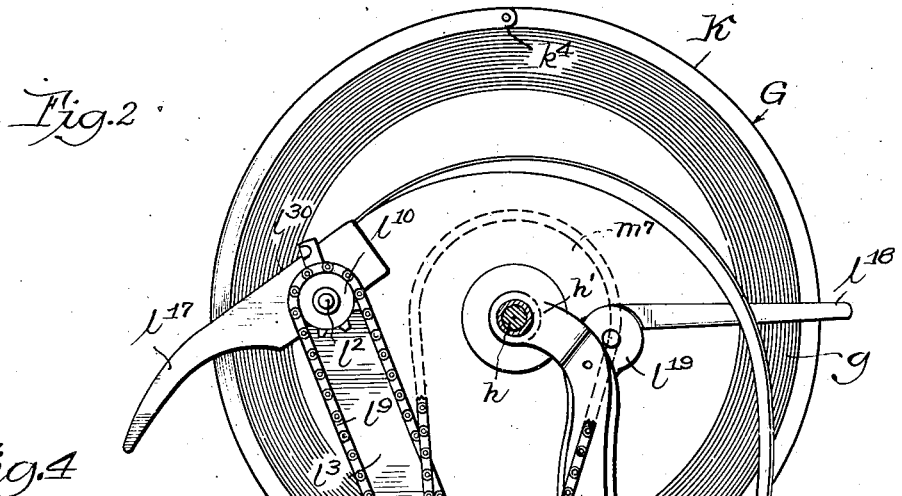
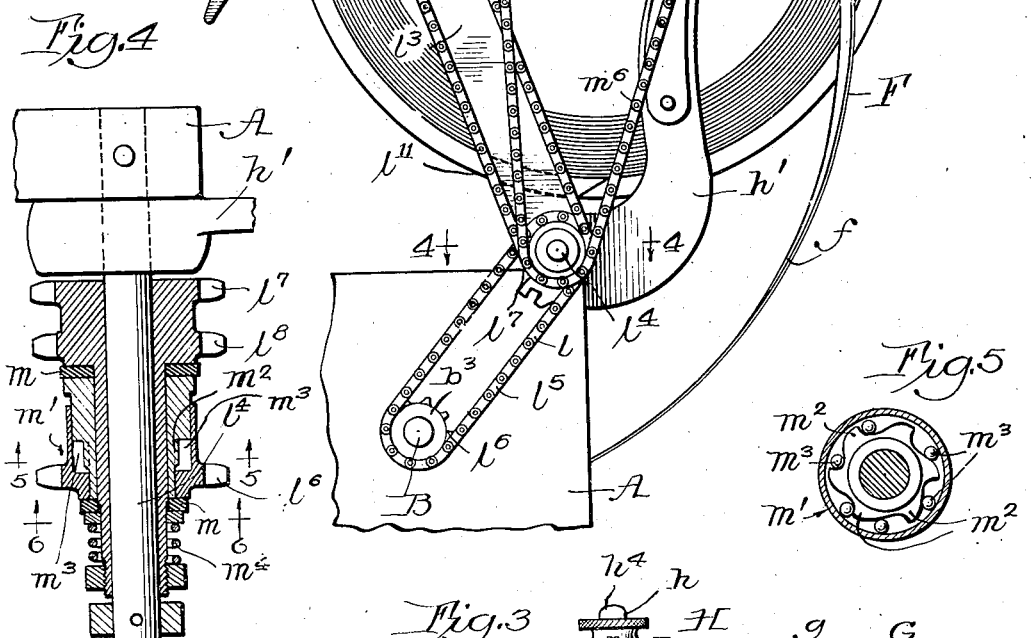
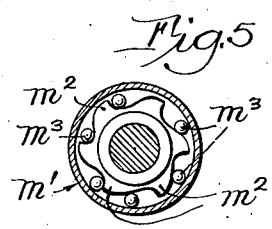
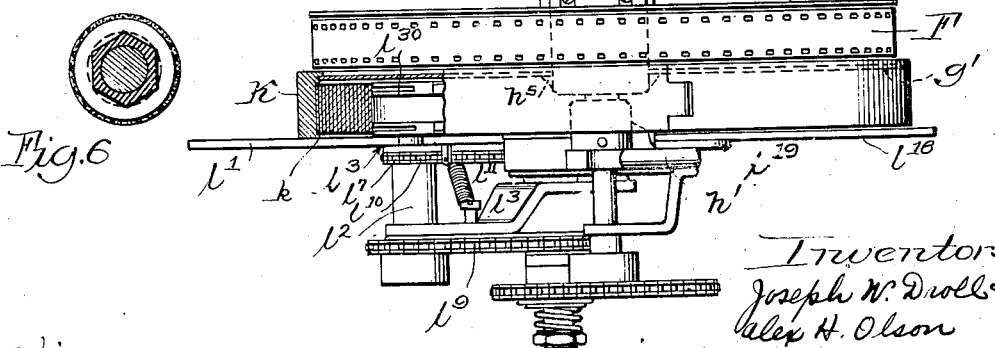

March 13, 1934.   J. W. DROLL ET AL   1,950,601
FILM WINDING MECHANISM
Filed Sept. 11, 1930   3 Sheets-Sheet 3
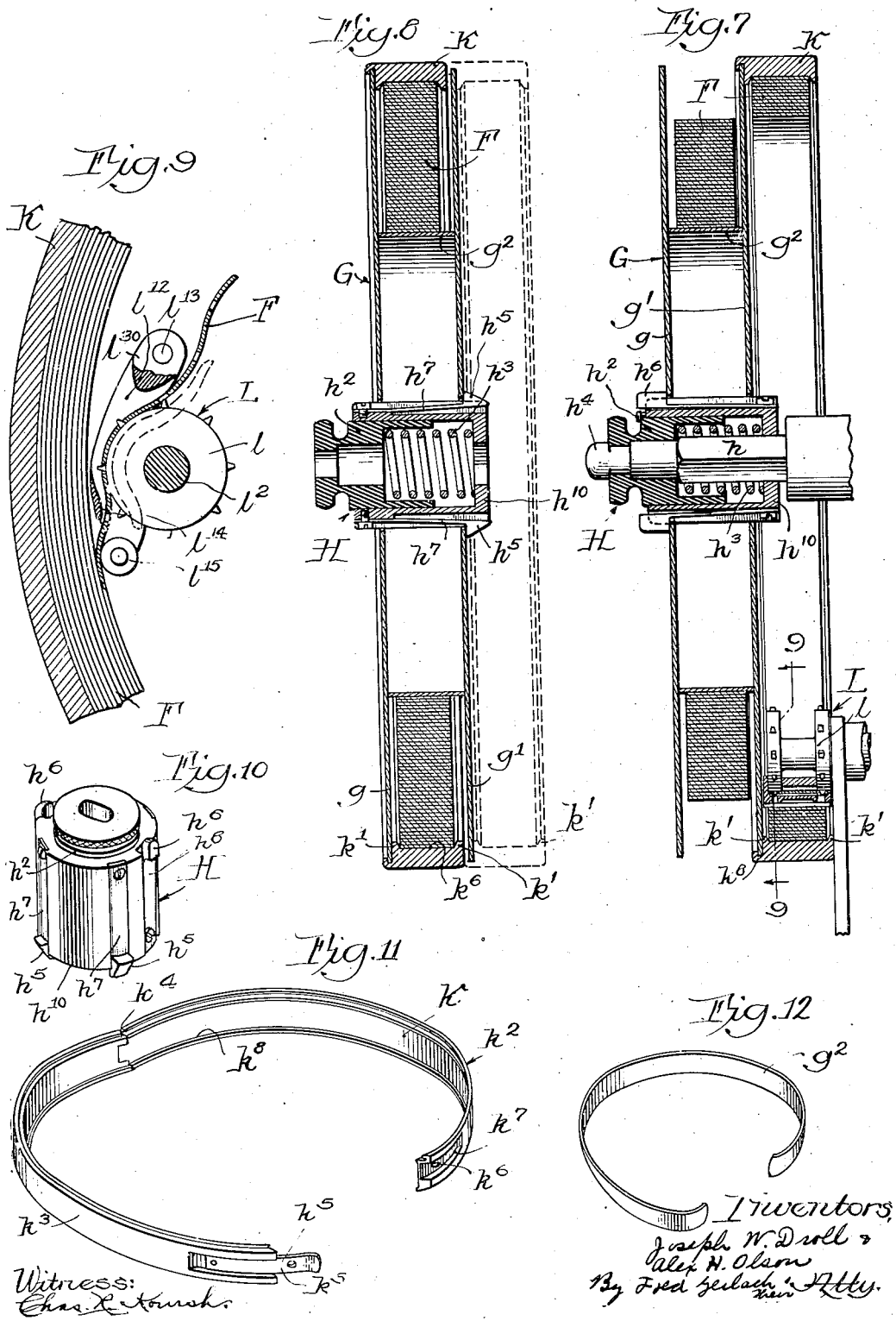

Patented Mar. 13, 1934

1,950,601

UNITED STATES PATENT OFFICE 1,950,601

FILM WINDING MECHANISM

Joseph W. Droll, Chicago, and Alex H. Olson, Evanston, Ill.; said Olson assignor to said Droll Application September 11, 1930, Serial No. 481,105

11 Claims. (Cl. 88—18.7)

The invention relates to film winding mechanism adapted for motion picture machines.

One object of the invention is to provide improved film-winding mechanism which is operable with a motion picture machine which winds the film after it has been exposed so that rewinding thereof between runs or exposures will be unnecessary.

Another object of the invention is to provide improved film winding mechanism which is operated synchronously with the feed-spool carrying a roll of film and by which the film will be taken and wound internally into a roll with its ends in substantially the same position as the roll on the feed spool from which the film passed to feed the mechanism.

Another object of the invention is to provide mechanism of this type which comprises a spool with an external roll of film and a ring with an internally wound roll.

Another object of the invention is to provide film-winding mechanism of this type which is simple in construction and can be readily applied to existing types of projectors.

Another object of the invention is to provide film-winding mechanism of this type which is adapted for operation by amateurs and is efficient in operation.

Other objects of the invention will appear from the detailed description.

In the drawings: Fig. 1 is a side elevation of a projector embodying the invention. Fig. 2 is a side elevation of the mechanism for winding the film internally into a coil after it has been exposed. Fig. 3 is a plan of the film feed and take-up mechanism. Fig. 4 is a section on line 4—4 of Fig. 2. Fig. 5 is a section on line 5—5 of Fig. 4. Fig. 6 is a section on line 6—6 of Fig. 4. Fig. 7 is a vertical section through the feed spool and the take-up ring in operative relation. Fig. 8 is a section showing the feed-spool with the take-up ring transposed to place the coil of film on the feed spool or assembled for retaining the film on the take-up spool. Fig. 9 is a section through the take-up ring and the mechanism for feeding the exposed film internally to the ring. Fig. 10 is a perspective of the detachable hub for the film winding mechanism. Fig. 11 is a perspective of the take-up ring. Fig. 12 is a perspective of the spring core or spreader for the roll of film while it is on the feed spool.

The improved film winding mechanism is exemplified with a projector of standard construction which comprises a suitable frame A; mechanism for feeding the film through the projector comprising a continuously driven shaft B, which is usually driven from an electric motor (not shown) associated with the frame, and has a sprocket $b^3$ to draw the film from the feed spool, and a suitable intermittent film feed device C also driven by the motor and of any suitable construction, for moving a loop of the film F around a drum $f$ in such a manner that the successive pictures will be projected through a lens D; a motor-driven shutter E for cutting off the light during the intermittent movements of the film produced by the intermittent mechanism C; a guide $b$ for retaining the film on the continuous feed sprocket $b^3$ and guiding it to the loose loop which is acted on by the intermittent device D; a guide $b'$ for guiding the film from the loop to, and retaining it on, feed-sprocket $b^3$. The mechanism thus far described may be of any suitable construction, as well understood in the art. Intermittent feed-mechanism C consists of a radially reciprocable and oscillatory member $c$ adapted to enter the perforations in the film to intermittently feed it, and is driven by gearing which is synchronously driven with the continuous feed-shaft D, as well understood in the art. This film-feeding mechanism is adapted to draw the film F from a full spool, for intermittent and successive exposure of the pictures thereon, and to continuously feed the exposed film from the loop to the take-up device for the film.

The film-winding mechanism comprises a spool G formed of sides or disks $g$, $g'$ spaced apart by a resilient strip $g^2$ which forms an expansible core for the film, a hub H on which the sides are removably and slidably mounted so they can be transposed from one side to the other, and a ring K which is adapted to receive the exposed film on its internal periphery and is rotated with the feed spool, and a feeding device L adapted to feed the film from the continuous feed sprocket $b^3$, to form an internally wound coil in the ring K.

The ring K is adapted to be clamped to and removed from either of the spool-sides $g$, $g'$, and is provided with an internal peripheral face $k$ between inwardly extending annular ribs $k'$. The exposed film is wound internally with its end outermost, into a roll within the face $k$ and between ribs $k'$, by feeding the film to the ring which rotates with the feed spool G so that the film will be wound into a coil in the ring with its outer and inner ends positioned the same as on the coil on the feed spool from which it is taken. To permit the ring K to be removed from and clamped to either of the spool sides $g$, $g'$, it is formed of sections $k^2$ and $k^3$ which are pivoted together at $k^4$. The free ends of these sections are locked together to close the ring by a resilient or spring strip $k^5$ which is attached to the free end of the section $k^3$ and snaps over a stud $k^6$ in a groove $k^7$ on the other section $k^2$. An internal annular groove $k^8$ is formed in the ring to fit around the margin of either of the spool sides so that when the ring is closed it will be fixedly held on the feed spool and rotate therewith at the same speed at which the feed spool is rotated by the film drawn therefrom by the continuous feed sprocket $b^3$. This exemplifies a take-up ring into which the exposed film will be wound into a roll with the outer end first taken from the feed spool outermost so that the pictures on the film will be arranged exactly as they were on the roll of film on the feed spool.

Mechanism L is provided to positively feed the exposed film from the continuous feed sprocket $b^3$, internally onto the ring K so that the film will be formed into a roll commencing with one end of the film on the outside of the roll and against the peripheral face of the ring, and the other end of the film on the inside of the roll so the ends will be disposed correspondingly to the disposition of the ends on the feed spool. Mechanism L comprises a film-engaging sprocket $l$ which is of the same size and driven at the same speed as the continuous feed sprocket $b^3$, and is movable bodily so that it is free to follow the inner convolution of the roll of film as it is built up internally in the ring K. Film-sprocket $l$ is fixed to a shaft $l^2$ which is journalled in a bracket $l^{30}$ in the outer end of an arm $l^3$ which is pivoted coaxially with a shaft $l^4$. The driving mechanism for sprocket $l$ comprises a chain $l^5$ which is driven by a sprocket $l^6$ on the feed-shaft B; and drives a sprocket $l^7$ which is loosely mounted on shaft $l^4$; and a chain $l^9$, which is driven by sprocket $l^8$ which is integral with sprocket $l^7$, and a sprocket $l^{10}$ which is fixed to the shaft $l^2$ of the movable sprocket $l$, and is driven by chain $l^9$. A spring $l^{11}$ is applied to arm $l^3$ to normally and yieldingly hold the feed device in operative relation to the innermost convolution of the roll of the film in the ring K, and to permit it to yield as the film accumulates in the ring. A guide roller $l^{15}$ is carried by bracket $l^{30}$, rides on the inner face of the film, and holds the sprocket disengaged from the film which has been wound in the ring K. The pressure of spring $l^{11}$, applied through arm $l^3$ and roller $l^{15}$ causes the film to be wound into a firm roll in the ring K. A film-guide $l^{12}$ is pivotally mounted at $l^{13}$ on the arm-bracket $l^{30}$, and is provided with a shoe $l^{14}$ which keeps the film on sprocket $l$. This mechanism exemplifies a positively driven device for feeding and winding the film internally into the take-up ring, by which the film will be continuously fed in synchronism with the film drawn from the feed spool, and which permits the device to follow the inner periphery of the gradually increasing roll in the take-up ring.

Hub H of the film winding mechanism is removably mounted on a shaft $h$ which is journalled in the end of a foldable arm $h'$. This shaft is normally free to be rotated by the feed spool G while the film is being advanced through the projector, so that the feed spool G will rotate the ring K to take up the film at the same speed at which it is paid out by the spool G, which varies according to the diameter of the outer lap of the roll on the feed spool. Hub H comprises a hollow member $h^{10}$ which is slidably fitted on the polygonal shaft $h$ and a spring-pressed sleeve $h^2$ which is adapted to removably lock the hub against endwise withdrawal from the shaft $h$. A spring $h^3$, between members $h^{10}$ and $h^2$, frictionally holds them apart. By rotating the sleeve $k$ relatively to an offset stud $h^4$ on the outer end of shaft $h$, the hub may be released for endwise removal from the shaft $h$, when a spool-side is to be transposed from one side of the hub to the other, both spool sides $g$, $g'$ being removably held on the hub for this purpose. Hooks $h^5$ on resilient strips $h^7$ carried in longitudinal grooves in the hub are adapted to secure the spool side $g'$ against the spring core $g^2$ and oppositely arranged lugs $h^6$ mounted on resilient strips $h^8$ are adapted to hold the other spool side $g$ against the core $g^2$ of the spool, to retain the film on the feed-spool.

A guide arm $l^{17}$ is mounted on the bracket $l^{30}$ on supporting arm $l^3$ to hold the portion of the coil of the film adjacent the feed device $l$ against endwise displacement from the ring. An arm $l^{18}$, pivotally secured to arm $h'$ in which shaft $h$ is mounted, is frictionally held in its assigned position by a spring-washer $l^{19}$ to hold the oppositely disposed portion of the roll of film in ring K against endwise displacement from the ring.

In some instances the projector is adapted to reversely feed the film so that any portion thereof may be run back and then exposed a second time during a run. This is usually accomplished by reversing the electric motor so that the continuous and intermittent film feeds will be operated in reverse direction. When this occurs, the feed spool $g$ is not rotated by the pull of the film effected by feed-sprocket $b^3$, and the film is paid out to said spool. For the purpose of driving the feed-spool to take up the film during this reverse operation, a one-way driving connection is provided which permits the feed spool to be rotated by the film during the forward operation of the film and which drives the feed-spool to wind up the film when the film is operated in reverse direction. This connection comprises a one-way clutch mounted on shaft $l^4$ and adapted to be frictionally driven by disks $m$, $m$ on the hub of sprockets $l^7$, $l^8$. This clutch comprises a sleeve $m'$ between said disks and provided with ratchet teeth $m^2$ to drive, through balls $m^3$, a sprocket $l^6$, which is loosely mounted on the sleeve $m'$ when the feed mechanism is driven in reverse direction. When the feed mechanism is operated to pull the film from spool G, sleeve $m'$ will be free to rotate on the hub of sprockets $l^7$, $l^8$. A spring $m^4$ is applied to clamp sleeve $m'$ between disks $m$, $m$. A chain $m^6$ is driven by a sprocket $l^6$ on sleeve $m'$, and drives a sprocket $m^7$ on the shaft $h$ when the film is reversed. This reverse driving of the feed spool rotates the ring K to pay out the film correspondingly to the take-up of the film by the feed-spool, so the film in the ring K paid out to the feed device L, without pull on the roll of film in the ring. Arm $h'$ for supporting the film feed mechanism is pivoted coaxially with and frictionally held on the shaft $l^4$, so that when the spool G and ring K are removed from shaft $h$, the arm may be folded in close relation to the frame A.

The operation of the machine is as follows:

A roll of film F with one end inside and the other on the outside, will be placed on the spool G with its outer lap of a diameter corresponding to the inner periphery of the take-up ring K, as hereinafter described. The outer end of the film will be threaded between guide $b$ and continuous feed sprocket $b^3$, thence to form loop around drum $f$, and thence between guide $b'$ and said sprocket, as well understood in the art. Said end will be passed in a loose loop to the feed device L for the take-up, and threaded between feed-sprocket $l$ and guide $l^{12}$ and on the outside of roller $l^{15}$, and laid against the inner periphery $h$ of ring K. Roller $l^{15}$, pressed against the ring by the pressure applied by spring $l^{11}$ to arm $l^3$ which carries the device L, will hold the film against the ring. The machine may then be operated to expose the pictures on the film. During this operation the loop of film between said sprocket $b^3$ and the feed device L will be taken up by the sprocket $l$ at the same speed at which it is delivered from the feed-sprocket $b^3$. The film from sprocket $l$ will be wound internally into a roll inside of the ring K until the entire film has been exposed and unwound from the feed spool G. During this operation the take-up ring K will be rotated by and with and at the same speed as, the feed-spool and the film will be wound into a roll inside of the take-up ring of the same diameter as the coil on the feed-spool. The speed of the feed-spool, which varies as the film is unwound, by the continuous feed of a constant speed, will correspondingly rotate the ring so the film will be taken up by the ring at the same rate that it is paid out. This results in winding the film into a roll in the take-up ring of the same size, and with its ends in the same position, as the roll unwound from the feed spool.

When the roll of film is to be exposed again, the outer spool side $g$ is slipped endwise off the hub H while the spring lugs $h^6$ are pressed together. The spool side $g'$ with the ring K thereon is moved sidewise to the outer end of the hub after the side $g$ has been removed from the hub. The hub H is then removed from the shaft $h$. The expansible core $g^2$ is then placed in the roll confined in the ring K. The previously removed side $g$ is then snapped over the hooks $h^5$ onto the inner end of the hub as illustrated in Fig. 8, and thereby locked on the hub. The roll of film and core $g^2$ will then be confined between the transposed spool sides $g'$ and held on the spool by ring K. If the film is to be exposed again the ring K is opened, removed from the outer spool side and clamped on the inner spool side, as shown in Fig. 7, so that the film will be again held on the spool for external unwinding and the ring K will be operatively positioned to internally receive the film. During this manipulation, the spring $l^{11}$ permits the film fitting device L to be pressed inwardly to permit the film in the ring K to be removed with said ring. If the film is to be stored, the ring may be left in the position illustrated in Fig. 8 so the ring will serve as a retainer around the outside of the film.

When the machine is to be carried in a case, the film-winding mechanism can be removed from shaft $l$ and arms $l^3$ and $h'$ can be folded downwardly into close relation to frame A.

This machine examplifies a film winding mechanism for rolls of films which dispenses with the necessity of rewinding the film to reverse it on the spool; film feeding mechanism which consists of a feed spool from the outer end of which the film is paid out to the film-feeding mechanism, with a take-up rotated by and with the feed spool, and by which the film will be formed into a roll with its ends disposed in the same relation as they were on the feed spool; and a film feeding mechanism of this type which is operative with reversible film-feeding mechanism.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a motion picture machine, the combination of a spool adapted to retain externally a roll of film, comprising a hub and removable sides slidable endwise onto and off the hub, a ring adapted to receive internally the film from the feed spool, and provided with means whereby it can be removably secured to either side of the spool, and means for feeding the film between the spool and the ring.

2. In a motion picture machine, the combination of a spool adapted to retain externally a roll of film, comprising a hub and removable sides slidable endwise onto and off the hub, a ring formed of separable sections, adapted to receive internally the film from the feed spool and provided with means whereby it can be removably secured to either side of the spool, and means for feeding the film between the spool and the ring.

3. In a motion picture machine, the combination of a spool comprising a hub, a pair of sides removably mounted on the hub, means for retaining the sides on the hub, an expansible core fitting between and independent of the sides, and a ring for receiving internally the film removably secured to one of the sides, said expansible core being adapted to be placed inside of the film in the ring, and to be transposed onto the spool with the film from the ring.

4. In a motion picture machine, the combination of a spool for retaining a roll of film for external unwinding, and comprising a hub and two sides slidable endwise on the hub from one end to the other, a ring adapted to receive internally the film from the spool, and mounted to rotate therewith, and means for feeding the film between the spool and the ring.

5. In a motion picture machine, the combination of a spool for retaining a roll of film for external unwinding, and comprising a hub and two sides slidable endwise on the hub from one end to the other, and being movable onto the hub over one end and removable from the other end of the hub, a ring adapted to receive internally the film from the spool and mounted to rotate therewith, and means for feeding the film between the spool and the ring.

6. In a motion picture machine, the combination of a spool for retaining a roll of film for external unwinding, comprising a hub and two sides slidable endwise on the hub, means for removably retaining both sides on the hub, a ring adapted to receive internally the film from the spool, and mounted to rotate therewith, and means for feeding the film between the spool and the ring.

7. In a motion picture machine, the combination of a supporting shaft, a spool mounted on the shaft for retaining a roll of film for external unwinding, comprising a hub and two sides slidable endwise of the hub from one end to the other while the hub remains on the shaft, a ring adapted to receive internally the film from the spool and mounted to rotate therewith, and means for feeding the film between the spool and the ring.

8. In a motion picture machine, the combination of a supporting shaft having one of its ends free, a spool mounted on the shaft, for retaining a roll of film for external unwinding, and comprising a hub and two sides slidable endwise of the shaft from one end of the hub to the other, a ring adapted to receive internally the film from the spool provided with means whereby it may be secured to either of said sides, said hub, sides, and ring being removable as a unit from one end of the shaft.

9. In a motion picture machine, the combination of a spool for retaining a roll of film for external winding comprising a hub and two sides removably held on the hub, a ring adapted to receive internally the film from the spool provided with means whereby it may be secured to one of the sides, said spool sides being movably mounted on the hub for movement from one end of the hub to the other, means for removably holding the sides on the hub, and means for feeding the film between the spool and the ring.

10. In a motion picture machine, the combination of a spool for retaining a roll of film for external winding comprising a hub and two sides removably held on the hub, a ring adapted to receive internally the film from the spool provided with means whereby it may be secured to one of the sides, the ring while attached to one of the sides being slidably mounted on the hub and movable with said side from one end of the hub to the other, and means for feeding the film between the spool and the ring.

11. In a motion picture machine, the combination of a supporting shaft having one of its ends free, a spool mounted on the shaft for retaining a roll of film for external unwinding comprising a hub rotatable upon the shaft and two spool sides each slidable endwise on the hub and spring latches for removably holding the spool sides on the hub so that the sides can be removed from the hub while the hub remains on the shaft.

JOSEPH W. DROLL.
ALEX H. OLSON.